(12) United States Patent
Jeon et al.

(10) Patent No.: US 6,713,720 B2
(45) Date of Patent: Mar. 30, 2004

(54) METHOD FOR CUTTING A NON-METALLIC SUBSTRATE

(75) Inventors: Baek-Kyun Jeon, Yongin-si (KR); Dae-Ho Choo, Suwon-si (KR); Hyung-Woo Nam, Yongin-si (KR); Yong-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/109,977

(22) Filed: Mar. 27, 2002

(65) Prior Publication Data

US 2003/0062348 A1 Apr. 3, 2003

(30) Foreign Application Priority Data

Sep. 29, 2001 (KR) .......................................... 2001-61030

(51) Int. Cl.$^7$ ................................................ B23K 26/38
(52) U.S. Cl. .................................. 219/121.72; 225/93.5
(58) Field of Search ....................... 219/121.67, 121.72; 225/93.5

(56) References Cited

U.S. PATENT DOCUMENTS

| | | | |
|---|---|---|---|
| 6,204,472 B1 | | 3/2001 | Muzzi et al. |
| 6,327,875 B1 | * | 12/2001 | Allaire et al. .......... 219/121.67 |
| 6,407,360 B1 | * | 6/2002 | Choo et al. ............ 219/121.67 |
| 6,420,678 B1 | * | 7/2002 | Hoekstra ............... 219/121.67 |
| 6,541,730 B2 | * | 4/2003 | Nam et al. ............. 219/121.67 |

* cited by examiner

Primary Examiner—Geoffrey S. Evans
(74) Attorney, Agent, or Firm—Cantor Colburn LLP (57) ABSTRACT

Disclosed is a method for cutting a non-metallic substrate. A designated cutting line formed on the non-metallic substrate is cut using a thermal stress generated by rapidly heating and cooling the designated cutting line. Further, a shape and an arrangement, etc., of an energy source is optimized, thereby maximizing a cutting speed of the non-metallic substrate and also precisely cutting the non-metallic substrate.

29 Claims, 10 Drawing Sheets

METHOD FOR CUTTING A NON-METALLIC SUBSTRATE

BACKGROUND OF THE INVENTION

1. Field of the Invention

The present invention relates to a method for processing a non-metallic substrate, and more particularly, to a method for cutting a non-metallic substrate, which optimizes a shape and an arrangement of an energy source for rapidly heating the non-metallic substrate, thereby increasing a cutting speed and also improving the quality of a cutting plane.

2. Description of the Related Art

Generally, a non-metallic substrate may be formed of silicon or glass.

For example, a non-metallic substrate silicon substrate may be used as a mother material of a semiconductor product for storing a massive amount of data per unit area or processing the massive amount of data per unit time.

Further, a non-metallic glass substrate may be used as a mother material of an LCD (liquid crystal display) panel of an LCD device having a much lower size and lighter weight than a CRT (cathode ray tube) type display device.

Recently, in order to maximize productivity of a product, a plurality of products, for example, the semiconductor chips or the LCD panels, are simultaneously formed on the non-metallic substrate as described above and then separated from each other.

For example, where the non-metallic substrate is the silicon substrate, a plurality of semiconductor chips is formed thereon, and then respectively separated and packaged, thus a plurality of semiconductor products can be produced from one silicon substrate.

Where the non-metallic substrate is the glass substrate, a plurality of display panels is formed thereon using a common fabricating process, and then separated so as to fabricate individual LCD panels, thereby maximizing the productivity of the product.

Because a plurality of LCD panels is simultaneously formed on the non-metallic substrate, the plurality of LCD panels goes through a separating process. Since the separating process is almost performed at the last stage of the LCD manufacturing process, if a defect is generated in the LCD panels during the separating process, the productivity is drastically reduced.

Further, since it is nearly impossible to cure the defect generated during the separating process, the defect in the separating process greatly lowers the productivity.

In order to separate each of the LCD panels from the non-metallic substrate, there has been used a contact-impact type cutting method.

In the contact-impact type cutting method, a scribe line is physically formed on a surface of the non-metallic substrate in a groove shape. Then, an impact is exerted on the scribe line so as to separate each of the products from the non-metallic substrate.

A diamond cutter is used as a conventional separating apparatus. The diamond cutter is provided with a diamond blade in which cutting diamonds are finely inlaid into outer circumferential surface portions of a thin circular plate and a rotating device is disposed at a center portion of the circular plate, and an impacting device for exerting a slight impact on the non-metallic substrate.

However, there are so many problems in the contact-impact type cutting method, therefore, the conventional cutting method causes the productivity to be greatly reduced.

Particularly, where the non-metallic substrate glass substrate is separated using the contact-impact type cutting method, an unexpected portion of the glass substrate is frequently cut.

This problem is caused, for example, by a cutting plane of the scribe line being roughly formed during formation of the scribe line on the non-metallic substrate.

If the cutting plane of the scribe line is roughly formed, as described above, a stress concentration phenomenon occurs at the rough cutting plane. Thus, a fine crack may be easily generated by a small stress applied from an outside. In addition, the fine crack rapidly spreads by a further applied small stress, vibration or impact. Finally, an undesired portion of the glass substrate is separated.

If the unexpected crack is spread to the display panel formed on the glass substrate, as described above, the unrepairable and serious defect is generated in the display panel.

Further, when the non-metallic substrate is separated using the conventional contact-impact type cutting method, since the non-metallic substrate is directly processed, chippings are generated in large quantities, so that a cleaning process for the separated non-metallic substrates is needed. Therefore, the number of process is increased and, correspondingly, productivity is decreased.

Alternatively, in order to cut the non-metallic substrate using the diamond blade, a cutting area including a margin corresponding to at least a width of the diamond blade has to be secured on the non-metallic substrate. However, it is difficult to maximize an effective surface area of the non-metallic substrate, on which the products are formed due to the cutting surface area.

SUMMARY OF THE INVENTION

The present invention provides a method for cutting a non-metallic substrate, in which the non-metallic substrate is separated without a cleaning process using a cutting tool and a non-contact type method so as to prevent a cutting failure of the non-metallic substrate, thereby maximizing an effective surface area on which products are formed in the non-metallic substrate and also increasing a cutting speed.

In one aspect, there is provided a method for cutting a non-metallic substrate. In this method, a first laser beam having a first axis and a second axis is scanned onto a predetermined cutting line formed on the non-metallic substrate to heat the cutting line. A length of the first and a length of the second axis have a ratio of about 40:1–80:1. A thermal stress is applied to the non-metallic substrate to form a scribe line. A second laser beam is scanned along the scribe line to cut the non-metallic substrate. The thermal stress is applied to the heated cutting line by supplying a cooling fluid. The first laser beam may have an elliptical shape.

In another aspect, there is provided a method for cutting a non-metallic substrate. In this method, a first laser beam is scanned onto a predetermined cutting line formed on the non-metallic substrate to heat the cutting line. A thermal stress is applied to the non-metallic substrate to form a scribe line. A second laser beam is scanned along the scribe line to cut the non-metallic substrate. The second laser beam has a first axis and a second axis, lengths thereof having a ratio of about 1.1:1–10:1. The thermal stress is applied to the heated cutting line by supplying a cooling fluid.

In still another aspect, there is provided a method for cutting a non-metallic substrate. In this method, a first laser beam is scanned onto a designated cutting line formed on the non-metallic substrate to heat the cutting line. A thermal stress is applied to the non-metallic substrate to form a scribe line. A second laser beam is scanned from a portion spaced apart from an end portion of the first laser beam by a distance—less than or equal to 30 mm, to cut the non-metallic substrate. The thermal stress is applied to the heated cutting line by supplying a cooling fluid.

In yet another aspect, there is provided a method for cutting a non-metallic substrate. In this method, a first laser beam is scanned onto a predetermined cutting line formed on the non-metallic substrate to heat the cutting line. The first laser beam has a first axis and a second axis, lengths thereof having a ratio of about 40:1–80:1. A thermal stress is applied to the non-metallic substrate to form a scribe line. A second laser beam is scanned on a portion spaced apart from an end portion of the first laser beam by a distance—less than or equal to 30 mm, to cut the non-metallic substrate. The second laser beam has a third axis and a fourth axis, lengths thereof having a ratio of about 1.1:1–10:1. The thermal stress is applied to the heated cutting line by supplying a cooling fluid.

According to the present invention, the non-metallic substrate is cut in a non-contact and non-impact manner, thus the quality of a cut face is enhanced, the cutting is made as desired, and the cutting speed is maximized.

BRIEF DESCRIPTION OF THE DRAWINGS

The above and other advantages of the present invention will become more apparent by describing in detail preferred embodiments thereof with reference to the attached drawings in which.

DETAILED DESCRIPTION OF THE INVENTION

Now, preferred embodiments of the present invention are herein described in detail with reference to the annexed drawings.

A method of cutting a non-metallic substrate according to one embodiment of the present invention employs a non-contact and non-impact type method instead of the conventional contact and impact type methods.

In order to cut the non-metallic substrate using the non-contact and non-impact type method, a particular physical property of the non-metallic substrate is utilized.

Specifically, where the non-metallic substrate is a glass substrate, the glass substrate is separated into multiple pieces using a physical property that a volume of the glass substrate is expanded or contracted by a heating or cooling operation.

At this time, in order to cut the non-metallic substrate, a thermal stress which is larger than a molecular bonding force of glass molecules in the glass substrate, is applied to the glass substrate by rapidly heating and cooling a part of the glass substrate, thereby forming a crack in the glass substrate. The crack is generated by breaking bonds between glass molecules in the glass substrate.

In the present invention, the crack has a positive effect or a negative effect according to whether or not the crack may be controlled.

In other words, there are predictable cracks and non-predictable cracks. With regard to the non-predictable cracks, it is impossible to predict the crack direction. The non-predictable cracks cause a fatal failure such as fracture of the substrate while the cutting process is carried out. The fracture of the substrate is an unrepairable failure.

With regard to the predictable cracks, it is possible to predict the crack direction and thus it is also possible to control the crack direction. Therefore, these predictable cracks allow for a selective cutting of a desired portion.

Figure 1:
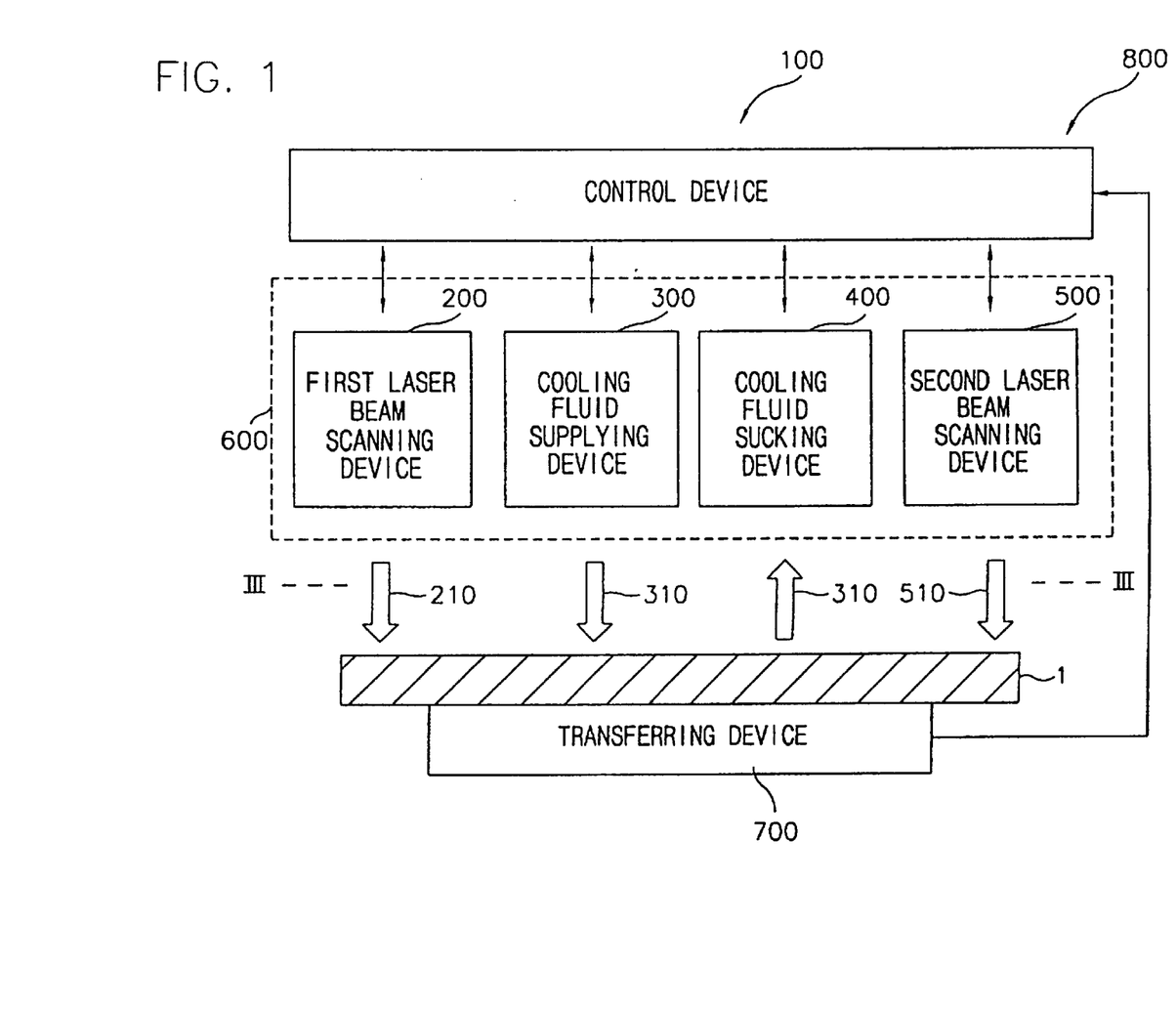
FIG. 1 is a schematic view of an apparatus for realizing a non-metallic substrate cutting method according to one embodiment of the present invention.

FIG. 1 is a schematic view of an apparatus for cutting the non-metallic substrate which may precisely calculate the crack direction so as to selectively cut the desired portion of the glass substrate.

Referring to FIG. 1, an apparatus 800 for cutting the non-metallic substrate has a substrate cutting module 600, a transferring device 700 and a control device 100.

The transferring device 700 is fixed at one of workpieces as the non-metallic substrate 1 which is to be cut by the substrate cutting module 600 or at the transferring device 700.

Where the transferring device 700 is fixed at the substrate cutting module 600, the substrate cutting module 600 performs the cutting operation of the non-metallic substrate 1 with the non-metallic substrate 1 in a fixed state, and the substrate cutting module 600 moving over the non-metallic substrate 1.

Alternatively, where the non-metallic substrate 1 is fixed at the transferring device 700, the non-metallic substrate 1 is moved with respect to the substrate cutting module 600 where the substrate cutting module 600 is fixed.

As described above, the transferring device 700 may freely move over a plane of the non-metallic substrate 1. In a preferable embodiment, the transferring device 700 is an X-Y transfer table which may freely move in an X- and Y-axial direction.

As shown in FIG. 1, preferably, the transferring device 700 transfers the non-metallic substrate 1 where the substrate cutting module 600 is in a fixed state.

In operation, the non-metallic substrate 1 is transferred by the transferring device 700 and the non-metallic substrate 1 is cut by the substrate cutting module 600.

The substrate cutting module 600 for cutting the non-metallic substrate 1 includes a first laser beam scanning device 200, a second laser beam scanning device 500, a cooling fluid supplying device 300 and a cooling fluid sucking device 400.

The first laser beam scanning device 200 generates a first laser beam 210, and the second laser beam scanning device 500 generates a second laser beam 510. The first and second laser beams heat a very small surface area of the non-metallic substrate 1.

The cooling fluid supplying device 300 for spraying a cooling fluid 310 is disposed between the first laser beam scanning device 200 and the second laser beam scanning device 500.

In addition, the cooling fluid sucking device 400 for sucking the cooling fluid 310 sprayed from the cooling fluid supplying device 300 is disposed between the first laser beam scanning device 200 and the second laser beam scanning device 500.

At this time, the first laser beam 210 generated from the first laser beam scanning device 200 and the cooling fluid 310 supplied from the cooling fluid supplying device 300 generate a certain thermal stress which is not enough to completely cut the non-metallic substrate 1, but sufficient to generate a guide crack having a desired depth on the surface of the non-metallic substrate 1.

The second laser beam 510 generated from the second laser beam scanning device 500 then applies a desired thermal stress on the guide crack so as to fully cut the non-metallic substrate 1.

The substrate cutting module 600 and the transferring device 700 are connected to a control device 100 for precisely controlling an operation of the substrate cutting module 600 and the transferring device 700.

A productivity of the apparatus 800 is greatly affected by a shape of the first laser beam 210, a shape of the second laser beam 510 and a distance between the first laser beam 210 and the second laser beam 510.

Hereinafter, three preferable embodiments are described, in which the first and second laser beams 210 and 510 generated from the apparatus and the distance between the first and second laser beams 210 and 510 are optimized so as to improve the cutting quality and the cutting speed.

Embodiment 1

Firstly, in order to cut the non-metallic substrate 1 using the apparatus 800, the control device 100 transmits a controlling signal to the transferring device 700 so that the transferring device 700 is located on a designated cutting line of the non-metallic substrate 1.

Then, the control device 100 transmits a controlling signal to the first laser beam scanning device 200 so as to precisely scan the first laser beam 210 of the first laser beam scanning device 200 on the designated cutting line of the non-metallic substrate 1.

At this time, the first laser beam 210 functions to locally pre-heat the non-metallic substrate 1 so as to form the guide crack on the non-metallic substrate 1.

In order to increase the cutting speed for cutting the non-metallic substrate 1, energy of the first laser beam 210 has to be efficiently transmitted to the non-metallic substrate 1.

The shape of the first laser beam 210 is an important factor that raises the temperature of the designated cutting line of the non-metallic substrate 1 within a short time.

This means that the cutting speed of the non-metallic substrate 1 is changed according to the shape of the first laser beam 210.

Particularly, assuming that a length of a long axis of the first laser beam 210 is $S_L$, a length (a width) of a short axis of the first laser beam 210 is $S_W$, an intensity of the first laser beam 210 is P, and a speed of the first laser beam 210 is V, a final temperature T(f) raised by the first laser beam 210 is calculated by a following equation.

$$T(f) \propto P/(S_W \times V)$$ [Equation 1]

According to the equation 1, the length $S_L$ of the long axis of the first laser beam 210 does not theoretically exert any influence on the final temperature T(f) raised by the first laser beam 210.

In theory, where only the length $S_L$ of the long axis of the first laser beam 210 is adjusted where the length $S_W$, the speed V and the intensity P of the short axis of the first laser beam 210 are constant, since a sum of the entire energy applied to a passage through which the first laser beam passes is the same regardless of the length $S_L$ of the long axis of the first laser beam 210, the length $S_L$ of the first laser beam 210 does not exert any influence on the final temperature T(f).

However, it is difficult to precisely apply the equation 1 in a substantial process. This is because the equation 1 does not take into consideration heat loss and radiated heat from the non-metallic substrate, which may be generated in the actual process.

If the heat loss and the radiated heat are considered, the final temperature T(f) of the non-metallic substrate 1 is affected by the length of the first laser beam 210 as well as the width of the first laser beam 210. Thus, the cutting speed of the non-metallic substrate 1 is affected.

Figure 3:
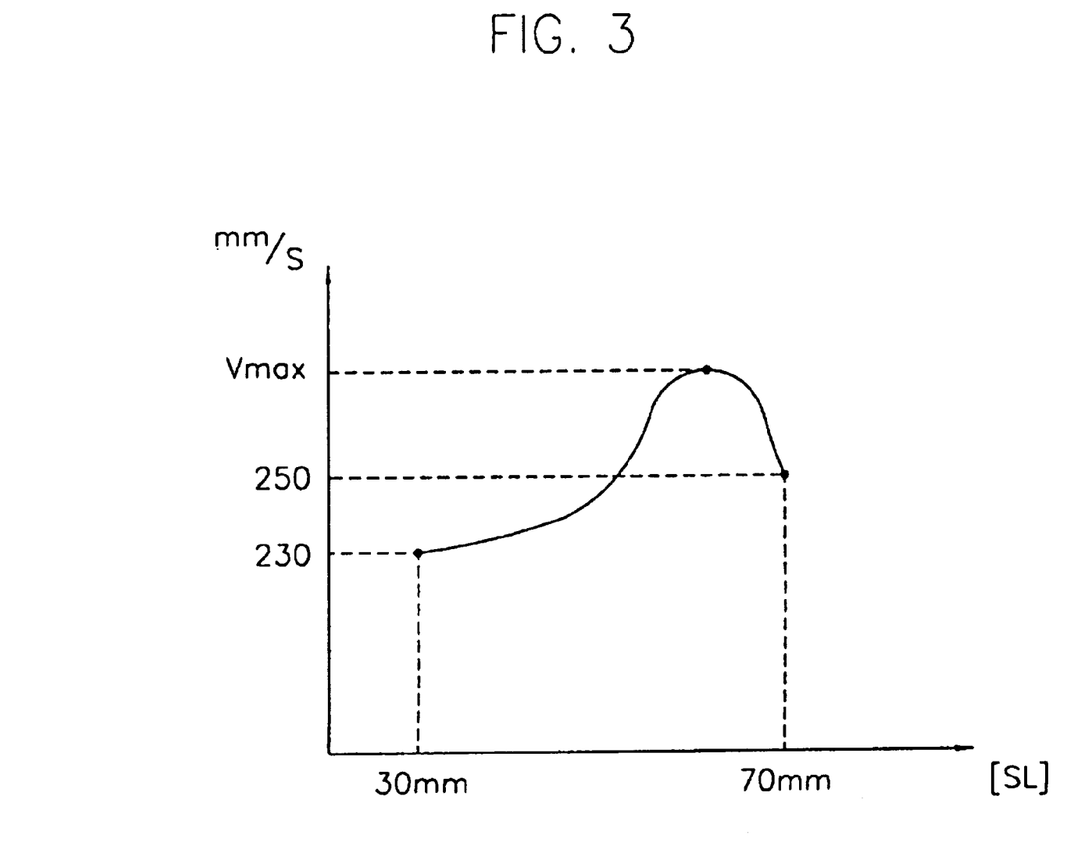
FIG. 3 is a graph showing a cutting speed of the non-metallic substrate according to a length of the first laser beam in one embodiment of the present invention.

Hereinafter, it will be described with reference to simulation experiment results. As shown in FIG. 3, the long axis of the first laser beam 210 is preferably controlled in a length of 30 mm to 70 mm, while the short axis of the first laser beam 210 is constant, thereby achieving a maximum cutting speed $V_{max}$.

A $CO_2$ laser beam is used as the first laser beam 210, the intensity of the first laser beam 210 is in a range of 50 to 250 W, and an LCD substrate, in which a TFT substrate having a thickness of 0.7 mm and a color filter substrate having a thickness of 0.7 mm are bonded, is used as the non-metallic substrate 1.

Where the long axis of the first laser beam 210 has a length of 30 mm or less, as shown in FIG. 3, the cutting speed is remarkably reduced in comparison with the maximum cutting speed $V_{max}$.

This is because, where the energy density of the first laser beam 210 is excessively high, a burning or a chipping phenomenon occurs on the surface of the non-metallic substrate 1 due to the concentrated energy, and thus a part of the energy is lost without being transferred to the non-metallic substrate 1.

Further, where the length of the long axis of the first laser beam 210 is larger than 70 mm, as shown in FIG. 3, the cutting speed is remarkably reduced in comparison with the maximum cutting speed $V_{max}$.

Figure 4:
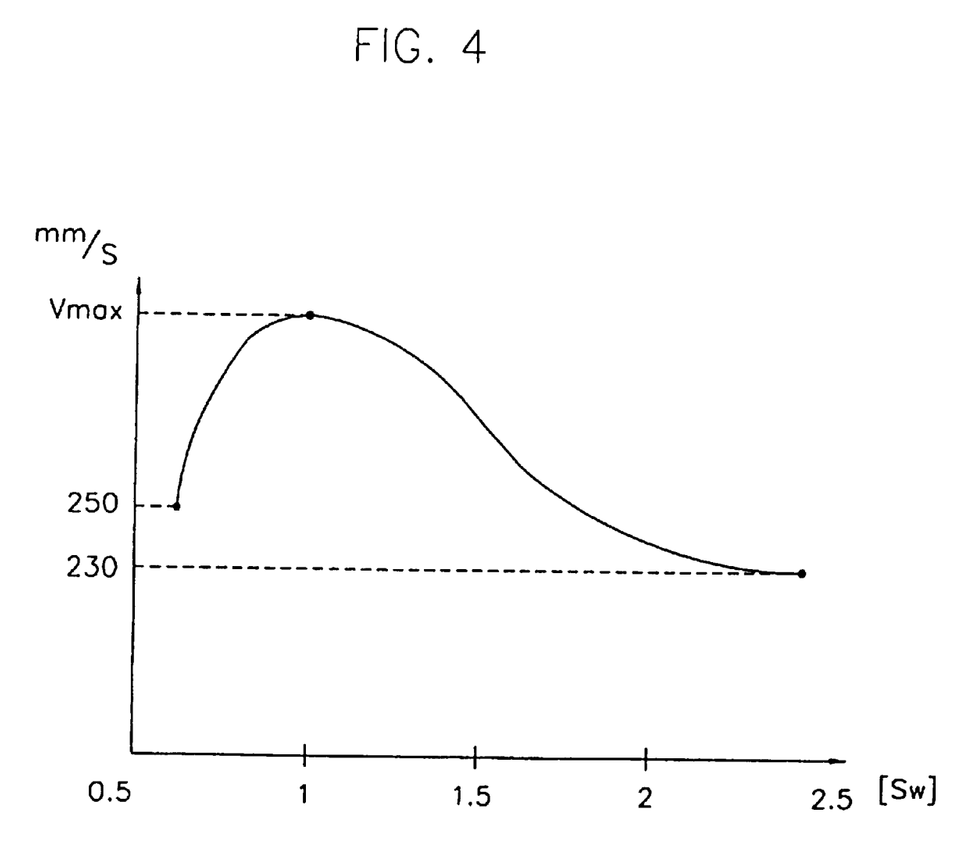
FIG. 4 is a graph showing the cutting speed of the non-metallic substrate according to a width of the first laser beam in one embodiment of the present invention.

Meanwhile, FIG. 4 shows a simulation result related to the cutting speed of the non-metallic substrate 1 according to change in the width of the first laser beam 210 where the length of the long axis of the first laser beam 210 is constant.

According to the simulation result, when the short axis of the first laser beam 210 is in a range of 1 to 2 mm, the cutting speed of the non-metallic substrate 1 is the maximum cutting speed $V_{max}$.

At this time, in case that the short axis of the first laser beam 210 has a length of 1 mm or less, there is formed a portion of the non-metallic substrate 1, in which the cutting operation is not completely performed. Further, an excessive energy is exerted on the surface of the non-metallic substrate 1, so that a scorching phenomenon in which the surface of the non-metallic substrate 1 is burned occurs. Therefore, there is a problem that the cutting speed is remarkably reduced in comparison with the maximum cutting speed $V_{max}$ and also the quality of the cut surface is degenerated.

In addition, where the short axis of the first laser beam 210 has a length of 2 mm or more, the energy density is remarkably reduced. Therefore, the cutting speed is remarkably reduced in comparison with the maximum cutting speed $V_{max}$. The quality of the cut surface is also deteriorated, since the cut surface has a wave shape.

Figure 5:
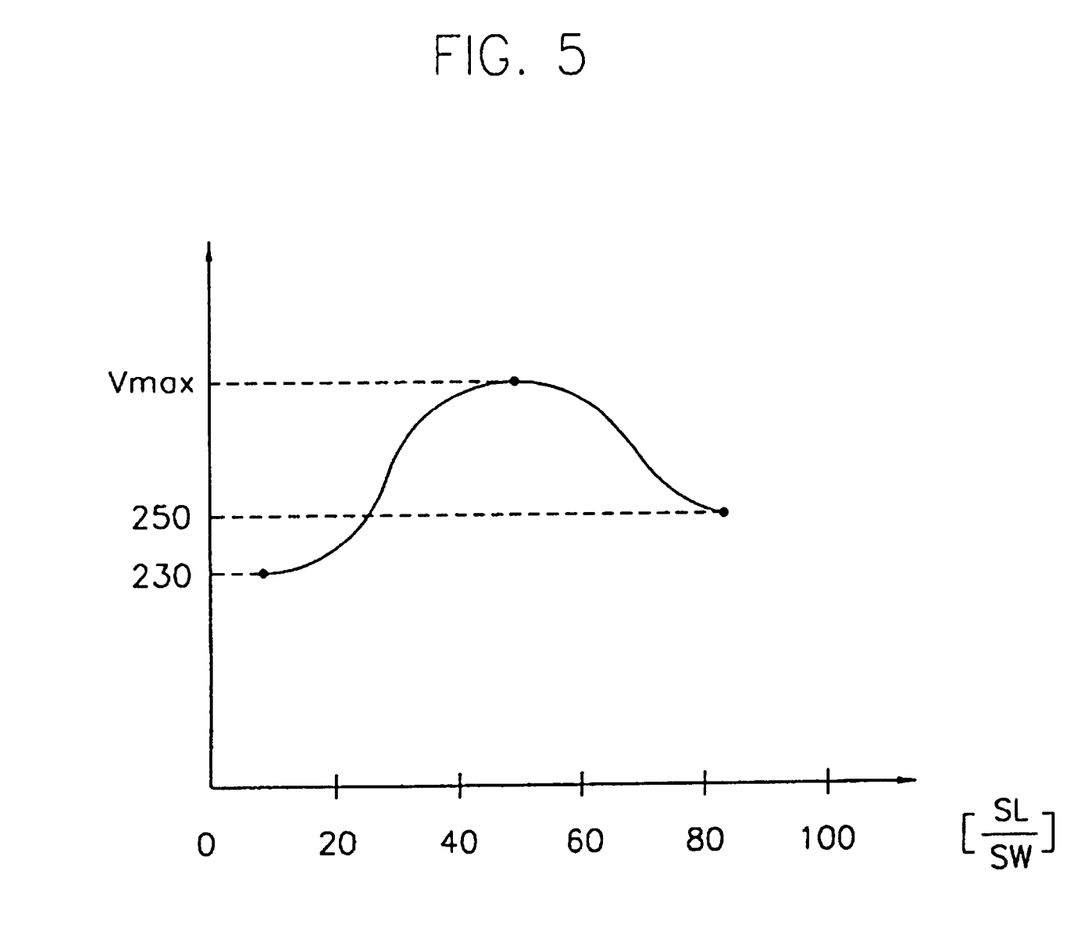
FIG. 5 is a graph showing the cutting speed of the non-metallic substrate according to a ratio of a length and a width of the first laser beam in one embodiment of the present invention.

Therefore, as shown in FIG. 5, where a ratio of the length of the long axis and the length of the short axis of the first laser beam 210 is in a range of 40:1–80:1 (long axis:short axis), the cutting substrate 1 is cut at the maximum cutting speed $V_{max}$, and the quality of the cut surface is improved.

Meanwhile, the change in the shape of the first laser beam 210 may further increase the cutting speed of the non-metallic substrate 1.

Figure 2:
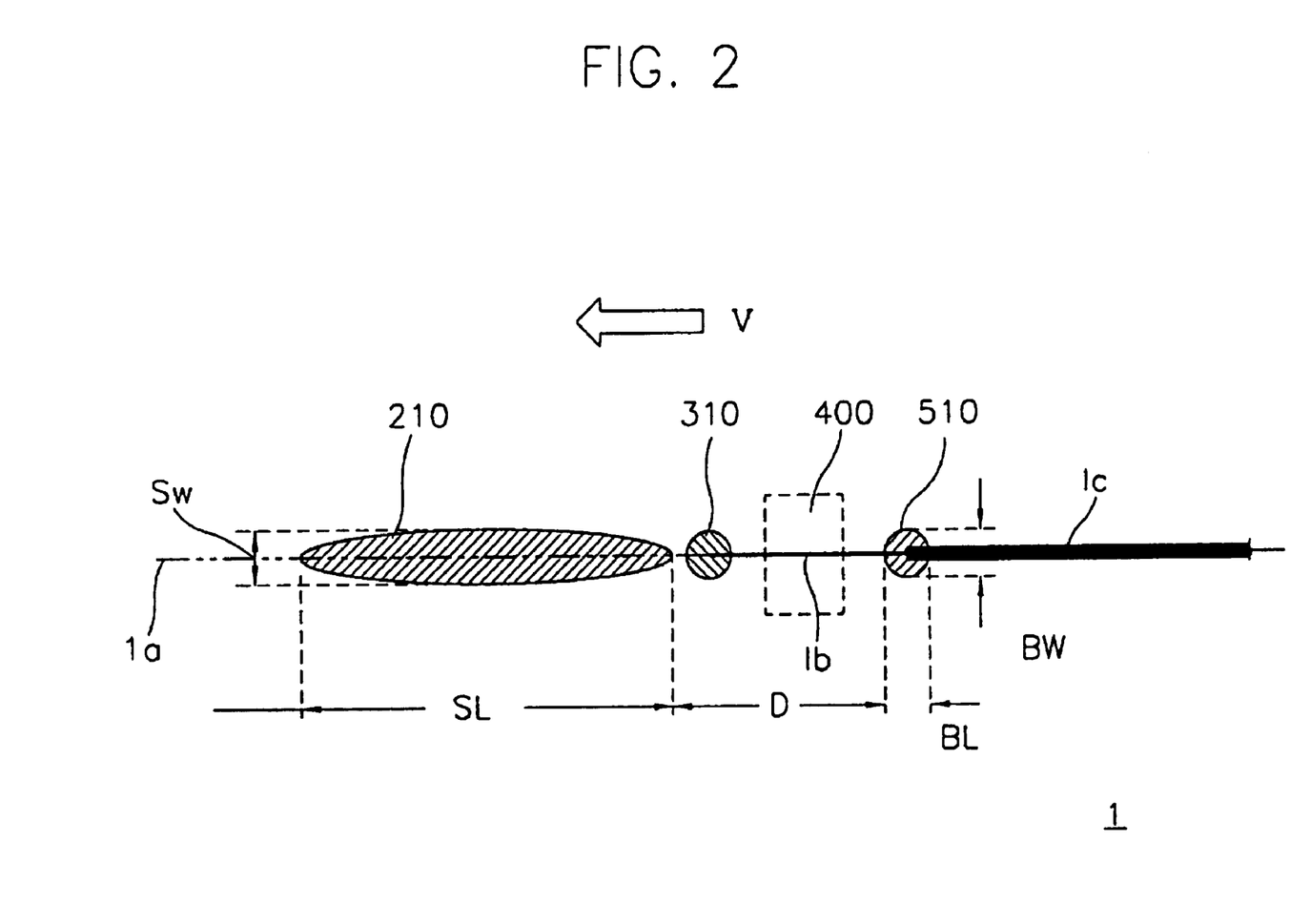
FIG. 2 is a schematic view showing a first laser beam, a cooling fluid, a cooling fluid sucking region and a second laser beam for realizing the non-metallic substrate cutting method according to one embodiment of the present invention.
Figure 8:
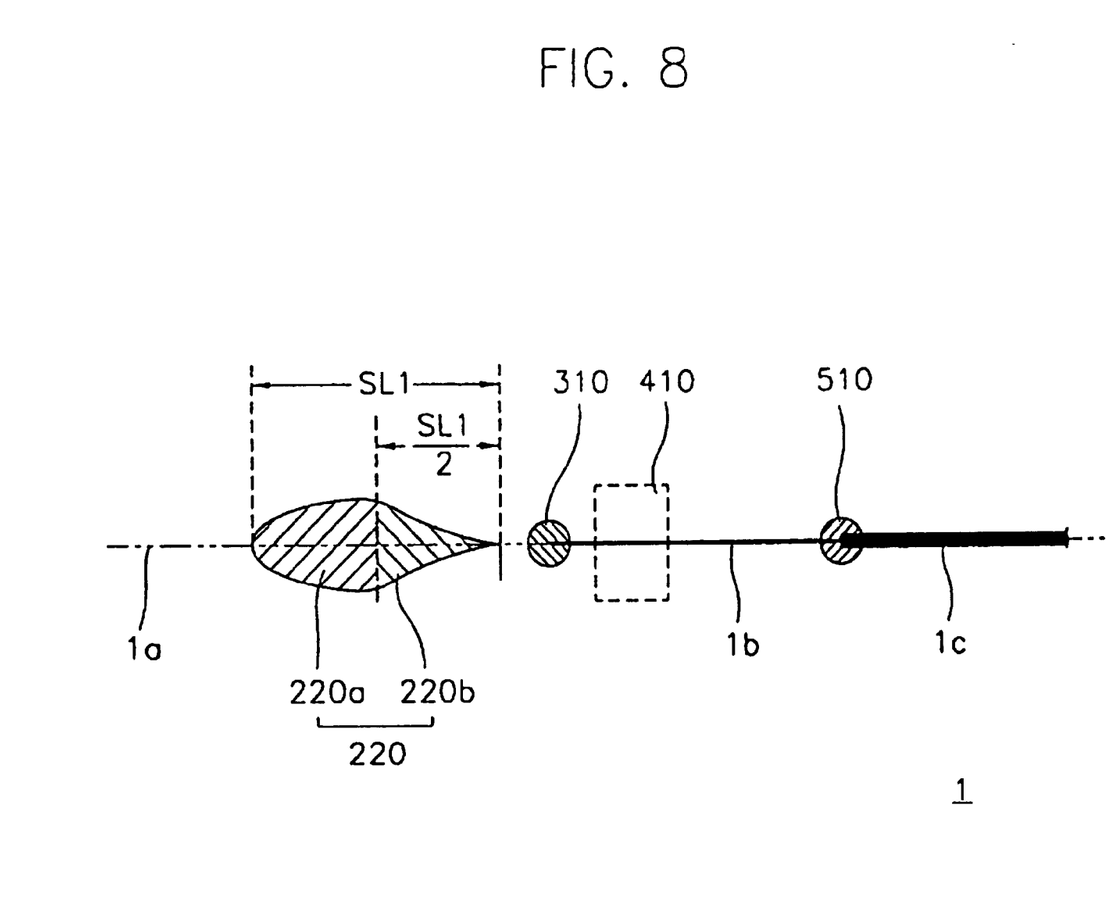
FIG. 8 is a schematic view showing the first laser beam according to another embodiment of the present invention.

The shape of the first laser beam 220 of FIG. 8 is different from that of the first laser beam 210 of FIG. 2. The first laser beam 210 of FIG. 2 is symmetric with respect to the long axis and also symmetric with respect to the short axis. However, the first laser beam 220 of FIG. 8 is symmetric with the long axis $S_{L1}$ but asymmetric with the short axis formed at a half position of the long axis $S_{L1}$.

At this time, where the first laser beam 220 is divided into two parts on the basis of the short axis thereof, a surface area of the first laser beam 220a which is located at a front portion, referring to an advancing direction of the first laser beam 220, is formed to be larger than that of the first laser beam 220b which is located at a rear portion.

As shown in FIG. 8, when the laser beam generated from the first laser beam scanning device 200 passes through a lens group comprised of a convex lens and a concave lens, the laser beam passes through a portion which is offset from a focus center of the lens group to one side, whereby the first laser beam, which is asymmetric with respect to the first laser beam 220, is obtained.

Meanwhile, referring to FIGS. 1, 2 and 8, the cooling fluid 310 is applied from the cooling fluid supplying device 300 to the designated cutting line la which is rapidly heated by the first laser beam 210. Therefore, a very large amount of thermal stress is applied to the designated cutting line 1a which has been rapidly heated. Thus, the guide crack having a desired depth from the surface of the non-metallic substrate 1 is formed due to the thermal stress exerted on the designated cutting line 1a. Hereinafter, the guide crack is called a scribe line 1b.

Then, the cooling fluid sucking device 400 completely sucks the cooling fluid 310 sprayed to the designated cutting line 1a during a process of forming the scribe line 1b.

Reasons why sucking the cooling fluid 310 again are as follows:

First, the suction prevents the contamination of a peripheral portion of the apparatus 800. Secondly, this minimizes the energy loss due to scattering of the cooling fluid 310 and the second laser beam 510 when scanning the second laser beam 510 to the non-metallic substrate 1 stained with the cooling fluid 310. Thirdly, this heats the cooling fluid with the second laser beam 510, thereby minimizing the heat loss on the non-metallic substrate 1.

Then, as shown in FIG. 2, the second laser beam 510 is scanned on the scribe line 1c to cause a volume expansion at both sides of the scribe line 1c due to the heat, thereby generating the excessive thermal stress on the scribe line 1c.

Thus, the crack is spread along the scribe line 1c. A crack direction is directed so as to fully cut the non-metallic substrate 1.

Embodiment 2

Hereinafter, a second embodiment for realizing the method of cutting the non-metallic substrate will be described.

In order to cut the non-metallic substrate 1 according to the second embodiment of the present invention, as shown in FIG. 1 or FIG. 2, the first laser beam 210 generated from the first laser beam scanning device 200 is scanned on the designated cutting line 1a of the non-metallic substrate 1 to rapidly and locally heat the designated cutting line 1a.

Then, the cooling fluid 310 is sprayed from the cooling fluid supplying device 300 to the rapidly heated cutting line 1a so as to generate a fine guide crack along the designated cutting line 1a. Hereinafter, the guide crack is called a scribe line 1b.

In order to fully cut the non-metallic substrate 1 along the scribe line 1b in which the fine crack is generated, the second laser beam 510 is scanned on the scribe line 1b. The second laser beam 510 functions to fully cut the scribe line 1b formed by the first laser beam 210 and the cooling fluid 310.

At this time, the second laser beam 510 has a higher intensity than the first laser beam 210 in order to fully cut the scribe line 1b. For example, the second laser beam 510 has an intensity of 200–500 W.

The second laser beam 510 as described above has an elliptical shape of which a long axis is directed to the scribe line 1b. Hereinafter, the long axis $B_L$ is defined as an axis formed to be parallel with the designated cutting line 1a, and a short axis $B_W$ is defined as an axis formed to be vertical to the designated cutting line 1a.

Whether the non-metallic substrate 1 is fully cut and the scorching phenomenon and a bridge are formed is distinguished according to the shape of the second laser beam 510.

Figure 6:
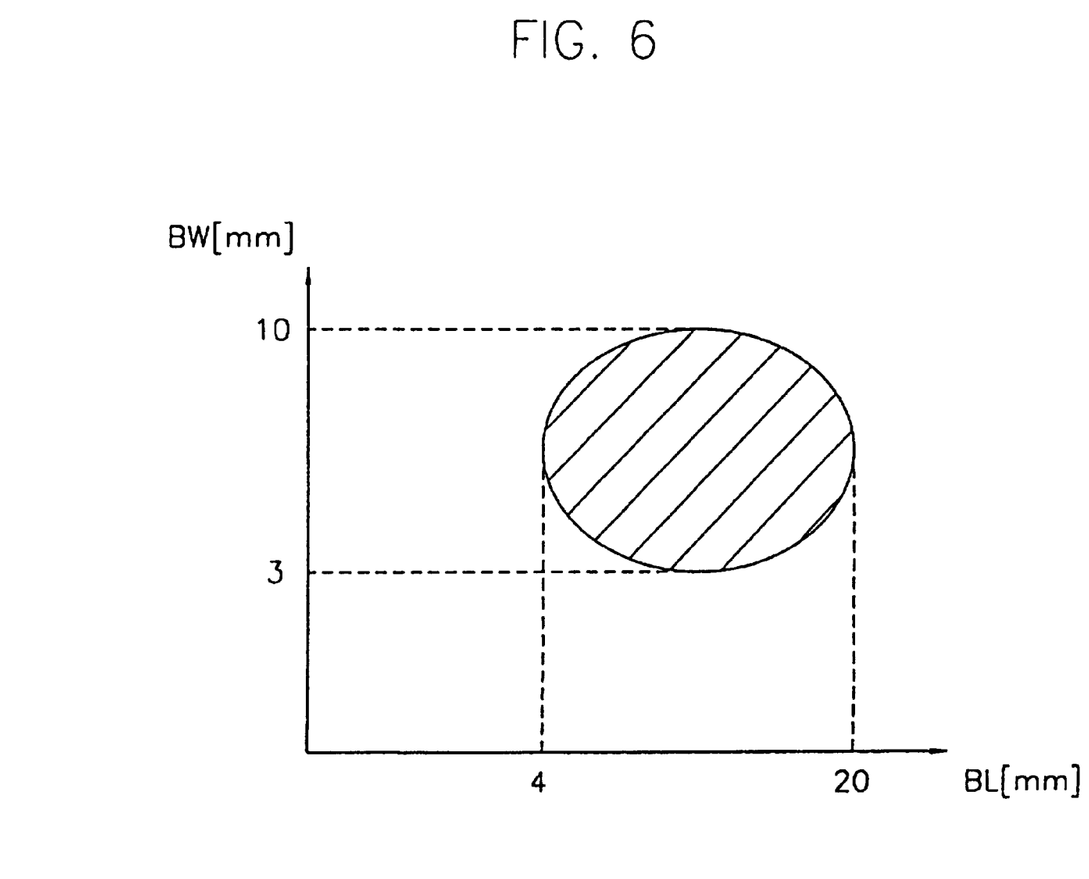
FIG. 6 is a graph showing a length and width region of the second laser beam for completely cutting the non-metallic substrate.

Referring to FIG. 2 or FIG. 6, the non-metallic substrate 1 is fully cut at a portion in which the long axis of the second laser beam 510 has a length of 4 to 20 mm and the short axis of the second laser beam 510 has a length of 3 to 10 mm, and also the scorching phenomenon and the bridge do not occur.

Where the length of the short axis of the second laser beam 510 is shortened and the length of the long axis thereof is constant, the bridge is not generated but the non-metallic substrate 1 is not fully cut. Further, the scorching phenomenon is easily generated.

On the contrary, where the length of the short axis of the second laser beam 510 is increased and the length of the long axis thereof is constant, the non-metallic substrate 1 is fully cut and the scorching phenomenon is not generated. But the bridge is generated.

Therefore, when the ratio of the long axis and the short axis is in a range of about 1.1:1–10:1, the non-metallic substrate 1 is fully cut, the scorching phenomenon is not generated, and also the bridge is not generated.

Embodiment 3

Hereinafter, a third embodiment for realizing the method of cutting the non-metallic substrate will be described.

In order to cut the non-metallic substrate 1 according to the third embodiment of the present invention, as shown in FIG. 2, the first laser beam 210 generated from the first laser beam scanning device 200 is scanned on the designated cutting line 1a of the non-metallic substrate 1 to rapidly and locally heat the designated cutting line 1a.

Then, the cooling fluid 310 is sprayed from the cooling fluid supplying device 300 to the rapidly heated cutting line 1a so as to generate a fine guide crack along the designated cutting line 1a. Hereinafter, the guide crack is called a scribe line 1b.

In order to fully cut the non-metallic substrate 1 along the scribe line 1b in which the fine crack is generated, the second laser beam 510 is scanned on the scribe line 1b. The second laser beam 510 functions to fully cut the scribe line 1b formed by the first laser beam 210 and the cooling fluid 310.

It is preferable to eliminate a gap between an end of the first laser beam 210 adjacent to the cooling fluid 310 and the second laser beam 510, which is, however, very difficult.

This is because the cooling fluid sucking device 400 for sucking the cooling fluid is disposed between the first laser beam 210 and the second laser beam 510.

At this time, a space between the first laser beam 210 and the second laser beam 510 is very important. In this embodiment, it is preferable that the space is 5 to 30 mm. However, where the space is 5 mm or below, there is a problem of interfering with the cooling fluid sucking device 400. Where the space is 30 mm or more, there is a problem that the scribe line 1b itself, which is formed by the first laser beam 210 and the cooling fluid 310, is restored.

Figure 7:
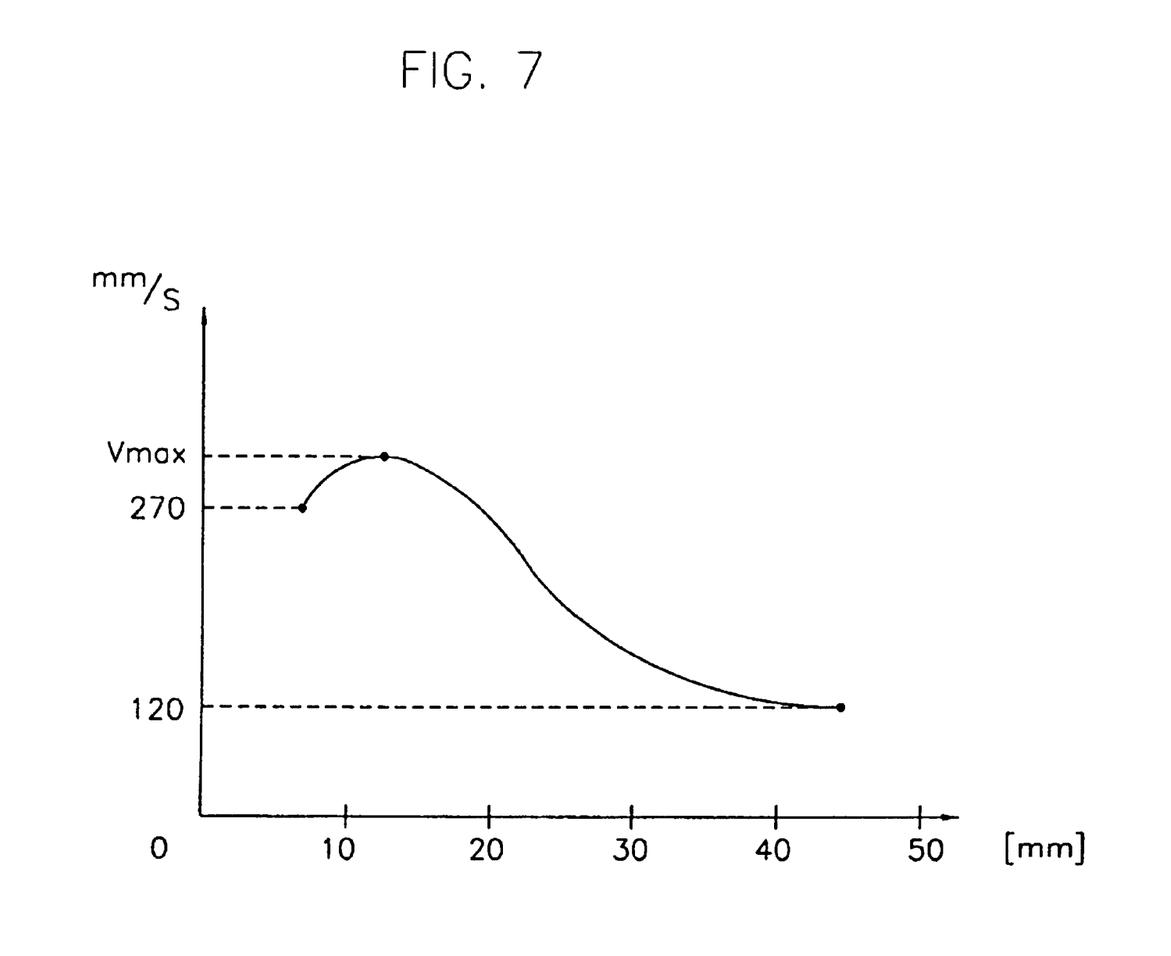
FIG. 7 is a graph showing the cutting speed of the non-metallic substrate according to a gap between the first laser beam and the second laser beam in one embodiment of the present invention.

Further, in an aspect of the cutting speed, referring to FIG. 7, where the space between the first laser beam 210 and the second laser beam 510 is 5 mm or less, the cutting speed is remarkably reduced in comparison with the maximum speed $V_{max}$. Where the space is 30 mm or more, the cutting speed is also remarkably reduced in comparison with the maximum speed $V_{max}$.

Hereinafter, a method of fabricating an LCD panel assembly according to the various embodiments will be described fully with reference to FIGS. 9A and 9B.

First, the method of fabricating an LCD panel assembly 960 is started from a process of fabricating an assembly substrate 930.

Figure 9A:
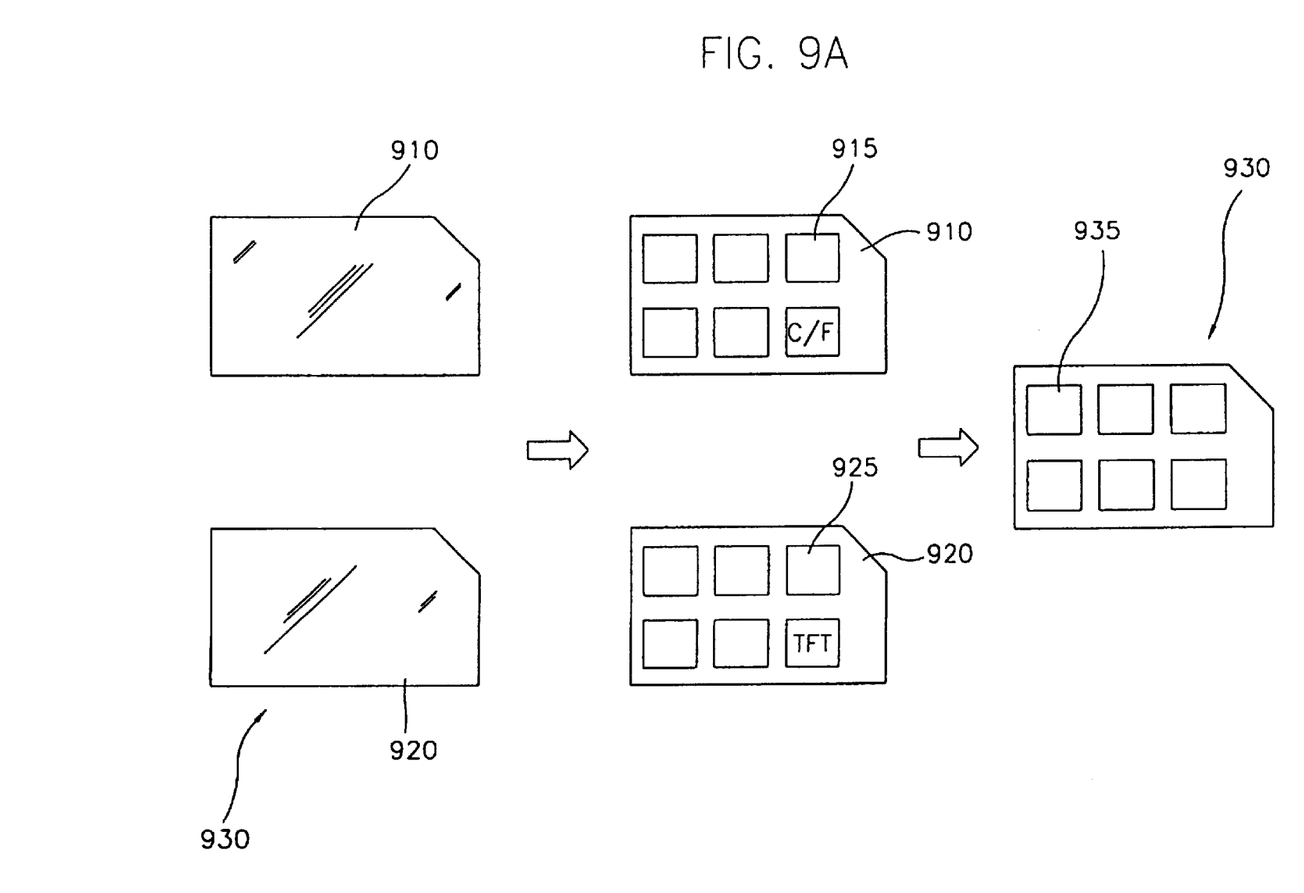
FIGS. 9A and 9B are process flow diagrams showing a process for fabricating an LCD panel assembly according to one embodiment of the present invention.

As shown in FIG. 9A, a color filter substrate part 915 and a TFT substrate part 925 are formed on each of transparent substrates, e.g., two glass substrates 910, 920 by respectively different semiconductor manufacturing processes. Then, the glass substrates 910, 920, on which the color filter substrate part 915 and the TFT substrate part 925 are respectively formed, are assembled to form the assembly substrate 930.

The color filter substrate part 915 and the TFT substrate part 925, which are arranged to be opposite to each other on the assembly substrate 930, are defined as an LCD device cell 935. Then, the liquid crystal is injected in the LCD device cell 935.

Figure 9B:
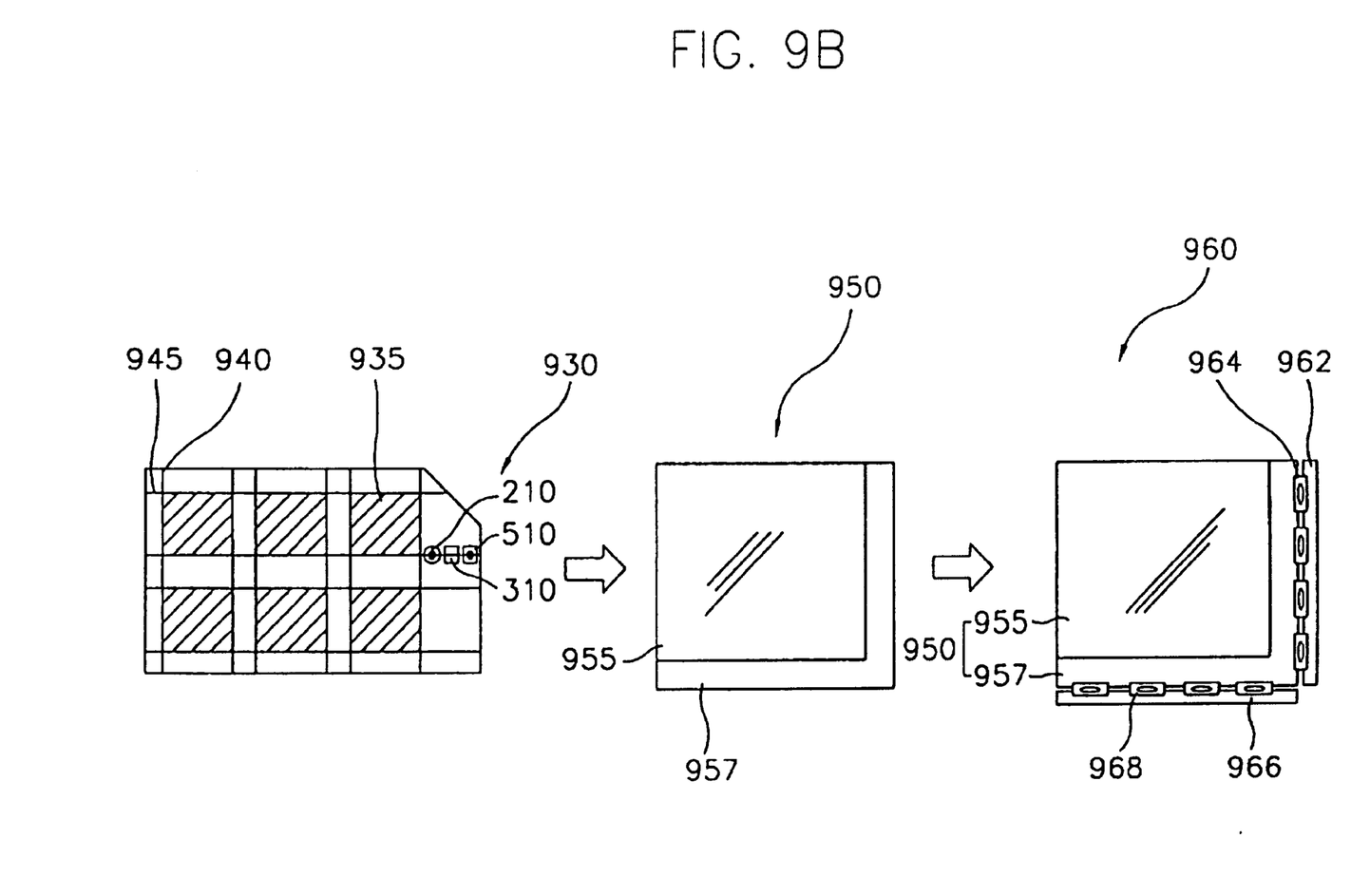

Meanwhile, as shown in FIG. 9B, the first laser beam 210 is scanned on a designated cutting line 940, 945 corresponding to a to-be-cut portion of the LCD device cell 935 formed on the assembly substrate 930 so as to rapidly heat the designated cutting line 940, 945. At this time, the first laser beam 210 has the elliptical shape. In other words, the ratio of the long axis and the short axis of the first laser beam 210 is controlled to be about 40:1–80:1, thereby rapidly heating the designated cutting line 940, 945 in an optimum condition.

As described above, where the designated cutting line 940, 945 is rapidly heated, the cooling fluid 310 is supplied to the designated cutting line 940, 945 so as to form a cutting groove due to the rapid heating and cooling operation. Hereinafter, the cutting groove is called a scribe line.

After forming the scribe line along the designated cutting line 940, 945 and then sucking the cooling fluid 310, the second laser beam 510 is scanned on a portion spaced apart from the end of the first laser beam 210 at a distance of 5–30 mm to heat the scribe line again.

At this time, a ratio of a long axis identical to a passing direction of the second laser beam 510 and a short axis perpendicular to the long axis of the second laser beam 510 is in a range of about 1.1:1–10:1. Therefore, the LCD device cell 935 is cut from the assembly substrate 930 to have the optimal speed and the high quality and thus to fabricate an LCD panel 950 comprised of a TFT substrate 957 and a color filter substrate 955.

Then, a driving module, e.g., a driving printed circuit board 962, 966 and a tape carrier package 964, 968, etc., is assembled to the LCD panel 950 to form the LCD panel assembly 960.

As described above, according to the present invention, the non-metallic substrate is cut in a non-contact and non-impact manner, thereby improving the quality of a cut face, and preventing an abnormal cutting operation, and maximizing the cutting speed.

While the present invention has been described in detail, it should be understood that various changes, substitutions and alterations can be made hereto without departing from the spirit and scope of the invention as defined by the appended claims.

What is claimed is:

1. A method for cutting a non-metallic substrate, the method comprising:
   scanning a first laser beam having a first axis and a second axis onto a predetermined cutting line formed on the non-metallic substrate to heat the cutting line, a length of the first axis and a length of the second axis having a ratio of about 40:1–80:1;
   applying a thermal stress to the non-metallic substrate to form a scribe line on the predetermined cutting line; and
   scanning a second laser beam onto the scribe line to cut the non-metallic substrate.

2. The method of claim 1, wherein the second laser beam is a single laser beam.

3. The method of claim 2, wherein the first laser beam is symmetric with respect to both of the first axis and the second axis.

4. The method of claim 2, wherein the first laser beam is symmetric with respect to the first axis and is asymmetric with respect to the second axis.

5. The method of claim 4, wherein the first laser beam has a distorted elliptical shape having a contracted tail portion.

6. The method of claim 2, wherein the second laser beam is collinear with the scribe line.

7. The method of claim 1, wherein the thermal stress is applied to the heated predetermined cutting line by supplying a cooling fluid.

8. The method of claim 7, further comprising removing the cooling fluid from the non-metallic substrate before the scanning the second laser beam.

9. The method of claim 1, wherein the length of the second axis is about 1–2 mm, and the length of the first axis is about 40–80 mm.

10. A method for cutting a non-metallic substrate, the method comprising:
    scanning a first laser beam onto a predetermined cutting line formed on the non-metallic substrate to heat the cutting line;
    applying a thermal stress to the non-metallic substrate to form a scribe line on the predetermined cutting line; and
    scanning a second laser beam onto the scribe line to cut the non-metallic substrate, the second laser beam having a first axis and a second axis, lengths thereof having a ratio of about 1.1:1–10:1.

11. The method of claim 10, wherein the second laser beam is a single laser beam collinear with the scribe line.

12. The method of claim 10, wherein the length of the second axis of the second laser beam is about 3–10 mm, and the length of the first axis of the second laser beam is about 4–20 mm.

13. The method of claim 10, wherein the thermal stress is applied to the heated predetermined cutting line by supplying a cooling fluid.

14. The method of claim 13, further comprising removing the cooling fluid from the non-metallic substrate before the scanning the second laser beam.

15. The method of claim 10, wherein the first laser beam has a third axis and a fourth axis, lengths thereof having a ratio of about 40:1–80:1.

16. The method of claim 10, wherein the first laser beam has a distorted elliptical shape having a contracted tail portion.

17. A method for cutting a non-metallic substrate, the method comprising:

scanning a first laser beam onto a predetermined cutting line formed on the non-metallic substrate to heat the cutting line;

applying a thermal stress to the non-metallic substrate to form a scribe line on the predetermined cutting line; and scanning a second laser beam onto the scribe line to cut the non-metallic substrate, the second laser beam being spaced apart from an end portion of the first laser beam by a distance of about 5–30 mm, to cut the non-metallic substrate.

18. The method of claim 17, wherein the thermal stress is applied to the heated predetermined cutting line by supplying a cooling fluid.

19. The method of claim 18, further comprising removing the cooling fluid from the non-metallic substrate before the scanning the second laser beam.

20. The method of claim 18, wherein a distance between the end portion of the first laser beam and the second laser beam is shorter than a length of the first laser beam.

21. The method of claim 17, wherein the first laser beam is a $CO_2$ laser beam having a power of about 50–250 W, and the second laser beam is a $CO_2$ laser beam having a power of about 200–500 W.

22. The method of claim 17, wherein the non-metallic substrate is a glass substrate or a silicon substrate.

23. The method of claim 17, wherein the first laser beam has a first axis and a second axis, lengths thereof having a ratio of about 40:1–80:1.

24. The method of claim 17, wherein the second laser beam is a single laser beam collinear with the scribe line.

25. The method of claim 17, wherein the first laser beam has a distorted elliptical shape having a contracted tail portion.

26. A method for cutting a non-metallic substrate, the method comprising:

scanning a first laser beam having an elliptical shape onto a predetermined cutting line formed on the non-metallic substrate to heat the cutting line, the first laser beam having a first axis and a second axis, lengths thereof having a ratio of about 40:1–80:1;

applying a thermal stress to the non-metallic substrate to form a groove-shaped scribe line on the cutting line; and scanning a second laser beam onto the scribe line to cut the non-metallic substrate, the second laser beam being spaced apart from an end portion of the first laser beam by a distance of about 5–30 mm, to cut the non-metallic substrate, the second laser beam having a third axis and a fourth axis, lengths thereof having a ratio of about 1.1:1–10:1.

27. The method of claim 26, wherein the thermal stress is applied to the heated predetermined cutting line by supplying a cooling fluid.

28. The method of claim 27, further comprising removing the cooling fluid from the non-metallic substrate before the scanning the second laser beam.

29. The method of claim 26, wherein the first laser beam has a distorted elliptical shape having a contracted tail portion.

* * * * *